(12) United States Patent
Sim

(10) Patent No.: US 9,407,378 B2
(45) Date of Patent: Aug. 2, 2016

(54) APPARATUS AND METHOD FOR REDUCING TDMA NOISE OF PORTABLE TERMINAL

(75) Inventor: Jae Yong Sim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 599 days.

(21) Appl. No.: 13/227,868

(22) Filed: Sep. 8, 2011

(65) Prior Publication Data

US 2012/0063445 A1  Mar. 15, 2012

(30) Foreign Application Priority Data

Sep. 13, 2010  (KR) .................. 10-2010-0089475

(51) Int. Cl.
*H04B 15/02* (2006.01)

(52) U.S. Cl.
CPC .......... *H04B 15/02* (2013.01); *H04B 2215/061* (2013.01)

(58) Field of Classification Search
CPC . H04B 15/212; H04B 15/02; H04B 2215/061
See application file for complete search history.

(56) References Cited

U.S. PATENT DOCUMENTS

| | | | | |
|---|---|---|---|---|
| 4,972,130 | A * | 11/1990 | Rossi et al. ................. | 318/293 |
| 6,154,546 | A * | 11/2000 | Uvacek ....................... | 381/60 |
| 6,694,034 | B2 * | 2/2004 | Julstrom et al. ............ | 381/315 |
| 7,190,187 | B2 * | 3/2007 | Hua et al. ................... | 326/27 |
| 7,206,426 | B1 * | 4/2007 | Julstrom et al. ............ | 381/331 |
| 2004/0150570 | A1 * | 8/2004 | Yuasa et al. ................ | 343/702 |
| 2008/0170739 | A1 * | 7/2008 | Suematsu et al. .......... | 381/380 |
| 2011/0170703 | A1 * | 7/2011 | Palma ......................... | 381/74 |
| 2013/0129126 | A1 * | 5/2013 | Callias et al. .............. | 381/315 |

FOREIGN PATENT DOCUMENTS

| KR | 10-2007-0040484 A1 | 4/2007 |
|---|---|---|
| KR | 10-0782345 B1 | 12/2007 |

\* cited by examiner

*Primary Examiner* — Andrew Lai
*Assistant Examiner* — Chuong M Nguyen
(74) *Attorney, Agent, or Firm* — Jefferson IP Law, LLP

(57) ABSTRACT

An apparatus and a method for reducing a time division multiple access noise of a portable terminal. The apparatus includes an interface unit to which an earphone is electrically connected, an audio processing unit including a virtual ground for transmitting and receiving an audio signal through the interface unit, a switch unit located electrically between the interface unit and the audio processing unit for electrically connecting a ground terminal of the interface unit with one of a real ground and the virtual ground of the audio processing unit, and a controller for controlling the switch unit to electrically connect the ground terminal of the interface unit with the virtual ground of the audio processing unit when a call function using the earphone is activated, and to electrically connect the ground terminal of the interface unit with the real ground when the call function using the earphone is deactivated.

8 Claims, 5 Drawing Sheets

APPARATUS AND METHOD FOR REDUCING TDMA NOISE OF PORTABLE TERMINAL

PRIORITY

This application claims the benefit under 35 U.S.C. §119(a) of a Korean patent application filed on Sep. 13, 2010 in the Korean Intellectual Property Office and assigned Serial No. 10-2010-0089475, the entire disclosure of which is hereby incorporated by reference.

BACKGROUND OF THE INVENTION

1. Field of the Invention

The present invention relates to an apparatus and a method for addressing a Time Division Multiple Access (TDMA) noise of a portable terminal. More particularly, the present invention relates to an apparatus for addressing a TDMA noise of a portable terminal induced upon an earphone, and a method thereof.

2. Description of the Related Art

In recent years, with the significant development of information and communication technology and semiconductor technology, the supply and the use of all types of portable terminals have rapidly increased. In particular, recent portable terminals have been developed that converge functions that were traditionally performed by various terminals. A representative example of the portable terminals is a mobile communication terminal that provides various functions, such as a TeleVision (TV) watching function (e.g., mobile broadcasting such as Digital Multimedia Broadcasting (DMB) or Digital Video Broadcasting (DVB)), a music playing function (e.g., Moving Picture Experts Group (MPEG)-1 or MPEG-2 Audio Layer-3 (MP3)), a photographing function, an Internet access function, and a general communication function such as a speech call or message transmission/reception.

Meanwhile, when an earphone is electrically connected to the portable terminal, a ground terminal of the earphone electrically connects with a real ground of the portable terminal. If the ground terminal of the earphone electrically connects with the real ground of the portable terminal, a Time Division Multiple Access (TDMA) noise may be induced upon the earphone through the ground of the portable terminal. That is, a TDMA noise may be heard though the earphone when the earphone is used with the portable terminal during a call. The resulting TDMA noise deteriorates call quality. The following is a simple description of the TDMA noise. A portable terminal transmits and receives a Radio Frequency (RF) signal in a TDMA scheme every predetermined period. That is, the portable terminal activates a power amplifier every transmission period to transmit the RF signal. Power consumption is great in the power amplifier. Due to power consumption by the power amplifier, a voltage drop of a battery occurs every transmission period in the portable terminal. A noise occurring at an audio output terminal due to the voltage drop (i.e., power ripple) that is generated every transmission period is referred to the 'TDMA noise'.

Further, there is a trend toward using an earphone as an antenna of the portable terminal without including a separate antenna for receiving an RF signal upon providing a radio receiving function. In a case of a portable terminal using an earphone as the antenna for receiving the RF signal, there is a need to address both the TDMA noise and radio receiving performance. Due to this, there is a difficulty in designing a circuit for the portable terminal to reduce the TDMA noise induced in the earphone.

SUMMARY OF THE INVENTION

Aspects of the present invention are to address the above-mentioned problems and/or disadvantages and to provide at least the advantages described below. Accordingly, an aspect of the present invention is to provide an apparatus for addressing a Time Division Multiple Access (TDMA) noise of a portable terminal occurring at an earphone during a call by using a virtual ground, and a method thereof.

Another aspect of the present invention is to provide an apparatus for reducing a TDMA noise of a portable terminal that may address the TDMA noise occurring at an earphone during a call and address deterioration of radio receiving performance, and a method thereof.

In accordance with an aspect of the present invention, an apparatus for reducing a TDMA noise of a portable terminal transmitting and receiving a radio frequency signal according to a TDMA scheme is provided. The apparatus includes an interface unit to which an earphone is electrically connected, and an audio processing unit including a virtual ground for transmitting and receiving an audio signal to and from the earphone through the interface unit, wherein a ground terminal of the interface unit is electrically connected to the virtual ground of the audio processing unit.

In accordance with another aspect of the present invention, an apparatus for reducing a TDMA noise of a portable terminal transmitting and receiving a radio frequency signal according to a TDMA scheme is provided. The apparatus includes an interface unit to which an earphone is electrically connected, an audio processing unit including a virtual ground for transmitting and receiving an audio signal to and from the earphone through the interface unit, a switch unit located electrically between the interface unit and the audio processing unit for electrically connecting a ground terminal of the interface unit with one of a real ground and the virtual ground of the audio processing unit, and a controller for controlling the switch unit to electrically connect the ground terminal of the interface unit with the virtual ground of the audio processing unit when a call function using the earphone is activated, and to electrically connect the ground terminal of the interface unit with the real ground when the call function using the earphone is deactivated.

In accordance with another aspect of the present invention, a method for reducing a TDMA noise of a portable terminal transmitting and receiving a radio frequency signal according to a TDMA scheme is provided. The method includes determining whether a call using an earphone is requested, and electrically connecting a ground terminal of an interface unit to which the earphone is electrically connected to a virtual ground included with an audio processing unit for transmitting and receiving an audio signal to and from the earphone when the call using the earphone is requested.

As illustrated above, in an apparatus and a method for reducing a TDMA noise of a portable terminal according to an exemplary embodiment of the present invention, electrical connection of a ground of an earphone with a virtual ground of an audio processing unit outputting a sound signal may efficiently reduce a TDMA noise induced upon the earphone during a call. Through this, exemplary embodiments of the present invention may improve call quality of an earphone call. Further, in a case where the portable terminal has a radio function, when the radio function is activated, a ground of an earphone electrically connects with a real ground of the portable terminal. Meanwhile, when an earphone call is performed, the ground of an earphone electrically connects with a virtual ground of an audio processing unit. Accordingly, exemplary embodiments of the present invention may prevent deterioration of a receiving function of a radio receiver from occurring due to electrical connection of the ground of the earphone with the virtual ground of the audio processing unit, and efficiently reduce a TDMA noise induced upon the earphone during a call in which the earphone is used.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A description of a portable terminal that provides an earphone call function is provided below. The portable terminal is a terminal for transmitting and receiving a Radio Frequency (RF) signal according to a Time Division Multiple Access (TDMA) scheme. Examples of the portable terminal include a mobile communication terminal, a smart phone, a Tablet Personal Computer (PC), a Personal Digital Assistant (PDA), etc. Hereinafter, the mobile communication terminal is described as a representative example of the portable terminal.

Figure 1:
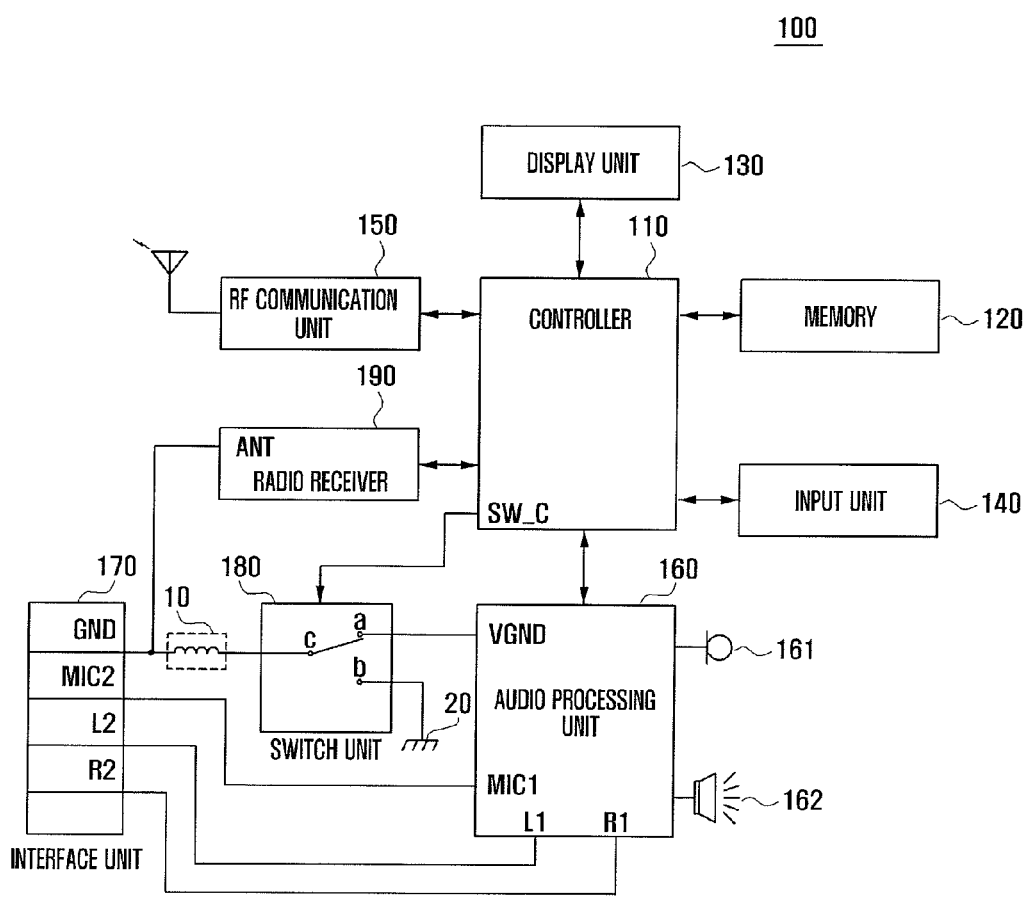
FIG. 1 is a block diagram illustrating a configuration of a portable terminal according to an exemplary embodiment of the present invention.

FIG. 1 is a block diagram illustrating a configuration of a portable terminal according to an exemplary embodiment of the present invention.

Referring to FIG. 1, a portable terminal 100 may include a controller 110, a memory 120, a display unit 130, an input unit 140, an RF communication unit 150, an audio processing unit 160, an interface unit 170, a switch unit 180, and a radio receiver 190.

The input unit 140 transfers a first input signal for inputting various numerals and character information and a second input signal associated with setting and control of respective functions of the portable terminal 100 to the controller 110. That is, the input unit 140 may include input keys for inputting numeral and character information and function keys for setting or controlling respective functions of the portable terminal 100. The function keys may include arrow keys, side keys, and hot keys set to perform certain functions. For example, the input unit 140 may include a call key for requesting a call and a function key for executing a radio function. The input unit 140 may be configured by a touch pad, a touch screen, a key pad of a general key arrangement, a QWERTY type key pad, or a combination thereof according to a particular implementation of the portable terminal 100.

The display unit 130 displays information input by a user or information provided to the user as well as various menus of the portable terminal 100. For example, the display unit 130 may provide various screens, for example, an idle screen, a menu screen, a message generating screen, and a call screen according to utilization of the portable terminal 100. The display unit 130 may be configured by a Liquid Crystal Display (LCD), an Organic Light Emitted Diode (OLED), or an Active Matrix OLED (AMOLED). When the display unit 130 is provided in a touch screen form, it may function as the input unit 140.

The RF communication unit 150 may establish a first communication channel for a call, a second communication channel for transmitting data, etc. That is, the RF communication unit 150 may establish a speech call channel, a data communication channel, an image call channel with a base station, etc. The RF communication unit 150 may transmit a speech signal and an image signal to another terminal or receive the speech signal and the image signal through the speech call channel and the image call channel under the control of the controller 110. The RF communication unit 150 may include an RF transmitter (not shown) for up-converting a frequency of a transmitted signal and for amplifying the signal, an RF receiver (not shown) for low-noise-amplifying a received signal and for down-converting the signal, and a transmitting and receiving separator (not shown) for separating a received signal and a transmitting signal. In particular, the RF communication unit 150 according to an exemplary embodiment of the present invention may transmit and receive an RF signal according to a TDMA scheme. Due to this, TDMA noise may occur at the portable terminal 100. The TDMA noise deteriorates call performance. In particular, a ground of an earphone may not be sufficient to attenuate the TDMA noise at an earphone when the earphone is used during a call.

Accordingly, the TDMA noise may significantly affect the call quality. Here, the TDMA noise and an occurring reason thereof are apparent to a person having ordinary skill in the art to which the present invention pertains, and thus a detailed description thereof is omitted.

The radio receiver 190 may receive a radio signal, and restore and transmit the received radio signal to the controller 110. In particular, the radio receiver 190 according to an exemplary embodiment of the present invention does not include a separate antenna but may use an earphone electrically connected with an interface unit 170 as an antenna for receiving the radio signal. That is, the radio receiver 190 may receive the radio signal through an earphone (not shown) electrically connected with the interface unit 170. To do this, an antenna terminal ANT of the radio receiver 190 electrically connects with a ground terminal GND of the interface unit 170. Further, the antenna terminal ANT of the radio receiver 170 may electrically connect with a matching unit 10. In the meantime, when the matching unit 10 is not required, the antenna terminal ANT of the radio receiver 170 may electrically connect with an input terminal c of the switch unit 180. A detailed description thereof is provided below with reference to the interface unit 170 and the switch unit 180.

The matching unit 10 provides at least one of filtering and impedance matching functions of a radio signal received through an earphone electrically connected with the interface unit 170. The matching unit 10 may be configured with an inductor as shown in FIG. 1. However, the present invention is not limited thereto. For example, the matching unit 10 may be configured with a combination of a resistor, an inductor, a capacitor, etc. FIG. 1 shows that the matching unit 10 is located electrically between the interface unit 170 and the switch unit 180. However, the matching unit 10 may be located electrically between a second output terminal b of the switch unit 180 and a real ground 20.

The interface unit 170 electrically connects an accessory such as a TeleVision (TV)-OUT cable, a 4-pole earphone, a 3-pole earphone, or a Tele Typewriter (TTY) cable to the portable terminal 100. Hereinafter, it is assumed that the interface unit 170 is configured with a 3.5 mm connector as an example. However, the interface unit 170 according to the present invention is not limited to a 3.5 mm connector. That is, the interface unit 170 may be configured by a 10-pole connector, a 20-pole connector, or a 24-pole connector.

The interface unit 170 may include a ground terminal GND for ground, a microphone terminal MIC2 for transmitting a microphone signal, a left sound terminal L2 for transmitting a left sound signal, and a right sound terminal R2 for transmitting a right sound signal. A ground terminal GND of the interface unit 170 may electrically connect with an antenna terminal ANT of a radio receiver 190 and the matching unit 10. In the meantime, when the matching unit 10 is not required or when the matching unit 10 is located electrically between the second output terminal b of the switch unit 180 and the real ground 20, the ground terminal GND of the interface unit 170 may electrically connect with the antenna terminal ANT of the radio receiver 190 and an input terminal c of the switch unit 180. A microphone terminal MIC2 of the interface unit 170 may electrically connect with a microphone terminal MIC1 of the audio processing unit 160, the left sound terminal L2 of the interface unit 170 may electrically connect with the left sound terminal L1 of the audio processing unit 160, and the right sound terminal R2 of the interface unit 170 may electrically connect with the right sound terminal R1 of the audio processing unit 160.

The interface unit 170 may include, or may otherwise be formed with, a structure to mechanically interface with and/or retain a plug of the earphone or other accessory device. Alternatively, the interface unit 170 may be separate from the structure to mechanically interface with and/or retain a plug of the earphone or other accessory device.

The electrical connection relationship has been described when an earphone is electrically connected to the interface unit 170 as an example. However, when the interface unit 170 is electrically connected to another accessory (e.g., TV-OUT cable), the foregoing electrical connection relationship of the interface unit 170 may change. To do this, the portable terminal 100 may further include at least one switching circuit (not shown) electrically between the interface unit 170 and the audio processing unit 160 and changing electrical connection paths of respective terminals of the interface unit 170 according to a type of an accessory electrically connected to the interface unit 170.

The switch unit 180 is located electrically between the interface unit 170 and the audio processing unit 160 and may be switched under the control of the controller 110. In detail, the switch unit 180 may be switched to electrically connect a ground terminal GND of the interface unit 170 to a virtual ground terminal VGND of the audio processing unit 160 or a real ground 20 of the portable terminal 100 according to the control of the controller 110. Here, the virtual ground refers to a ground which functions as if it is shorted due to a voltage difference between two terminals of around zero volts but is actually is not physically shorted. The real ground refers to a ground that is actually shorted. Here, the virtual ground is apparent to a person of ordinary skill in the art to which the present invention pertains, and thus a detailed description thereof is omitted.

The switch unit 180 is preferably configured by a switch having very small resistance. For example, the switch unit 180 may include one input terminal c and two output terminals a and b as shown in FIG. 1. The input terminal c of the switch unit 180 may electrically connect with the matching unit 10. Meanwhile, when the matching unit 10 is not required or is located electrically between the second output terminal b of the switch unit 180 and a real ground 20, the input terminal c of the switch unit 180 may electrically connect with a ground terminal GND of the interface unit 170 and the antenna terminal ANT of the radio receiver 190. The first output terminal of the switch unit 180 may electrically connect with a virtual ground terminal VGND of the audio processing unit 160, and the second output terminal b of the switch unit 180 may electrically connect with a real ground 20 of the portable terminal 100. The switch unit 180 may electrically connect the input terminal c to the first output terminal a or the second output terminal b according to a switch control signal output from a control terminal SW_C of the controller 110.

The audio processing unit 160 may be configured by a sound component transmitting and receiving an audio signal to perform encoding and decoding. The audio processing unit 160 may include a codec and an audio amplifier AMP. In particular, the audio processing unit 160 according to an exemplary embodiment of the present invention may include a virtual ground VGND. The audio processing unit 160 electrically connects with a microphone 161 and a speaker 162. The audio processing unit 160 may convert a speech signal input from the microphone 161 into data, and transmit the data to the controller 110. The audio processing unit 160 may convert a speech signal input from the controller 110 into an analog signal, and output the analog signal through the speaker 162. Moreover, the audio processing unit 160 may output various audio signals (e.g., Moving Picture Experts Group (MPEG)-1 or MPEG-2 Audio Layer-3 (MP3) files, and audio signal according to playing moving image files) created by the portable terminal 100 through the speaker 162. In addition, the audio processing unit 160 may receive a speech signal through a microphone (not shown) included in an accessory (e.g., earphone) or output a speech signal and an audio signal input from the controller 110 through a speaker (not shown) included in the accessory. To do this, when an earphone electrically connects with the interface unit 170, a microphone terminal MIC1 of the audio processing unit 160 electrically connects with a microphone terminal MIC2 of the interface unit 170, a left sound terminal L1 of the audio processing unit 160 outputting a left sound signal electrically connects with a left sound terminal L2 of the interface unit 170, a right sound terminal R1 of the audio processing unit 160 outputting a right sound signal electrically connects with a right sound terminal R2 of the interface unit 170, and a virtual ground VGND of the audio processing unit 160 electrically connects with the first output terminal a of the switch unit 180.

The memory 120 may store an Operating System (OS) of the portable terminal 100, and application programs, user data and transmitting and received data necessary for various option functions, for example, a sound playing function or an image or moving image playing function. In particular, the memory 120 according to an exemplary embodiment of the present invention may store a program controlling the switch unit 180 such that a ground terminal GND of the interface unit 170 electrically connects with a virtual ground terminal VGND of the audio processing unit 160 or a ground terminal GND of the interface unit 170 electrically connects with the real ground 20 according to an activation of an earphone call function.

The controller 110 may control an overall operation of the portable terminal 100 and signal flow between internal blocks of the portable terminal 100. In particular, the controller 110 of an exemplary embodiment of the present invention may control the switch unit 180 according to the activation of an earphone call function. In detail, when the earphone call function is activated, the controller 110 may control the switch unit 180 such that the ground terminal GND of the interface unit 170 electrically connects with the virtual ground terminal VGND of the audio processing unit 160. Conversely, when the earphone call function is deactivated, for example, when an earphone is not electrically connected to the interface unit 170, when an earphone is electrically connected to the interface unit 170 but a call is not requested, or when a radio receiving function is activated, the controller 110 may control the switch unit 180 such that the ground terminal GND of the interface unit 170 electrically connects with the real ground 20. To do this, the controller 110 may include a means for sensing electrical connection of an accessory and a means for determining a type of an electrically connected accessory. In the meantime, the controller 110 does not include a separate means for determining a type of an accessory but may output a supportable accessory list on the display unit 130 upon sensing electrical connection of the accessory, and recognize that an accessory selected by a user is mounted in the interface unit 170 from the list.

The controller 110 may determine whether a call function is activated (i.e., a call is requested) in a state in which an earphone is electrically connected to the interface unit 170. The call request includes an outgoing call and an incoming call. If the call is requested, the controller 110 may control the switch unit 180 such that the ground terminal GND of the interface unit 170 electrically connects with a virtual ground terminal VGND of the processing unit 160. To do this, the controller 110 may generate a control signal requesting electrical connection of an input terminal c of the switch unit 180 with a first output terminal a, and transmit the generated control signal to the switch unit 180 through a control terminal SW_C. As illustrated earlier, by electrically connecting a ground of an earphone with a virtual ground instead of a real ground, the portable terminal 100 according to an exemplary embodiment of the present invention may mitigate a TDMA noise induced at the earphone to a degree that a user may not recognize the TDMA noise. That is, an exemplary embodiment of the present invention may efficiently reduce the TDMA noise.

In the meantime, when the call is terminated, the controller 110 may control the switch unit 180 to electrically connect a ground terminal GND of the interface unit 170 with the real ground 20. To do this, the controller 110 may generate a control signal requesting to electrically connect an input terminal c of the switch unit 180 with a second output terminal b, and transmit the generated control signal to the switch unit 180 through a control terminal SW_C. This is performed to prevent a side effect occurring when the ground terminal GND of the interface unit 170 electrically connects with a virtual ground in a state that a TDMA noise does not occur. For example, when a radio function is activated in a state that the ground terminal GND of the interface unit 170 electrically connects with the virtual ground, radio receiving performance may be deteriorated.

The foregoing exemplary embodiment has illustrated that a ground terminal GND of the interface unit 170 electrically connects with the real ground when an earphone call is terminated. However, the present invention is not limited thereto. For example, in another exemplary embodiment of the present invention, when the earphone call is terminated, the controller 110 may control to maintain a state that a ground terminal GND of the interface unit 170 electrically connects with the virtual ground. When a radio receiving function is activated, the controller 120 may control to electrically connect the ground terminal GND of the interface unit 170 with the real ground.

Furthermore, another exemplary embodiment of the present invention may control a switch unit 180 according to an activation of the radio receiving function. That is, another exemplary embodiment of the present invention may control the switch unit 180 to electrically connect the ground terminal GND of the interface unit 170 with the virtual ground when the radio receiving function is inactivated. When the radio receiving function is activated, another exemplary embodiment of the present invention may control the switch unit to electrically connect the ground terminal GND of the interface unit 170 with the real ground 20.

Although not shown in FIG. 1, the portable terminal 100 may further include structural elements having additional functions such as a camera module for photographing images or moving images, a near distance communication module for near distance wireless communication, a broadcast receiving module for receiving broadcast, a digital sound source module like an MP3 module, and an Internet communication module executing Internet functions. Since the structural elements can be variously changed according to a trend toward the convergence of digital devices, any additional elements can be included. Moreover, the portable terminal 100 may include structural elements equivalent to the foregoing structural elements.

Figure 2:
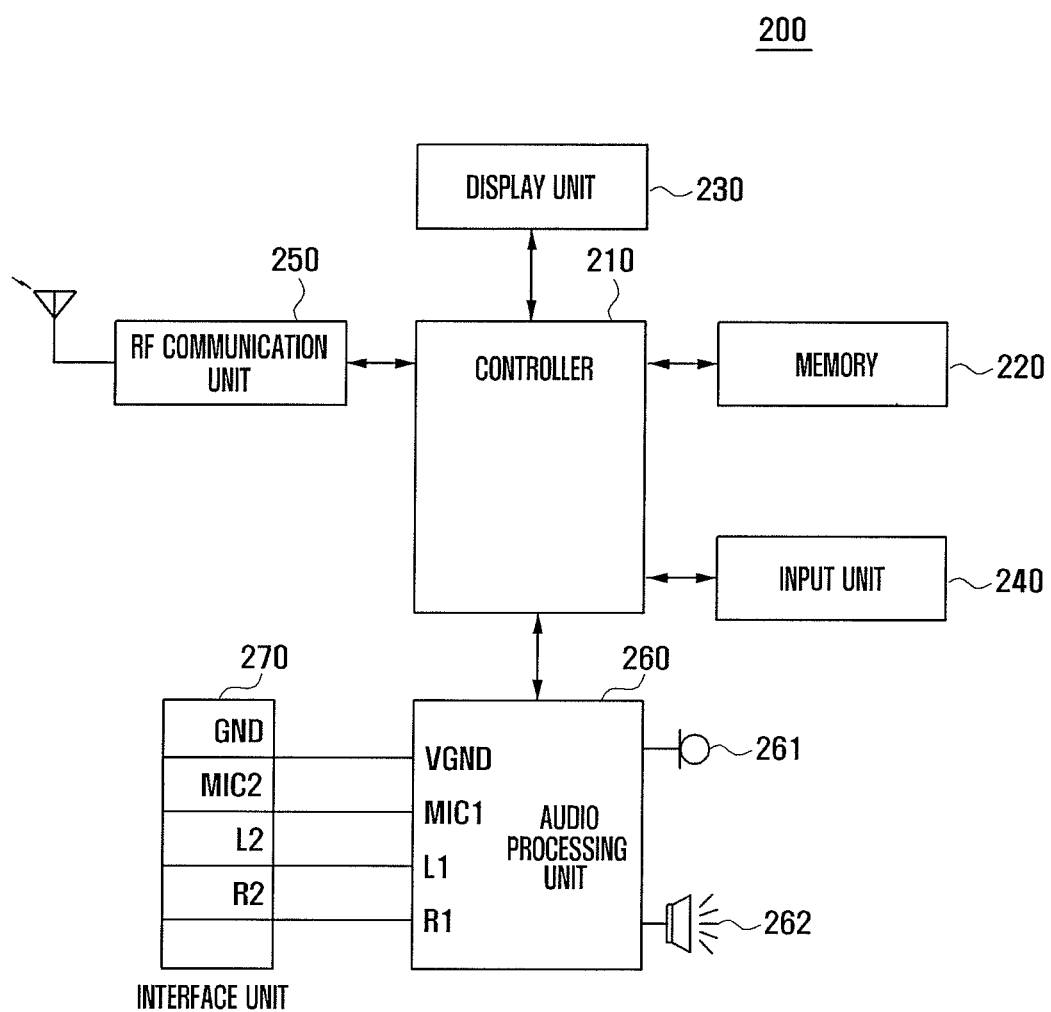
FIG. 2 is a block diagram illustrating a configuration of a portable terminal according to another exemplary embodiment of the present invention.

FIG. 2 is a block diagram illustrating a configuration of a portable terminal according to another exemplary embodiment of the present invention.

Referring to FIG. 2, a portable terminal 200 may include a controller 210, a memory 220, a display unit 230, an input unit 240, an RF communication unit 250, an audio processing unit 260, and an interface unit 270. The portable terminal 200 having a construction mentioned above does not provide a radio receiving function and does not have a separate antenna without using an earphone as an antenna for receiving a radio signal. That is, the portable terminal 200 is characterized in that an electrical connection between a ground terminal GND of the interface unit 270 and a virtual ground terminal VGND of an audio processing unit 260 is not controlled by the switch unit 180 of FIG. 1. Instead, the ground terminal GND of the interface unit 270 and the virtual ground terminal VGND of the audio processing unit 260 are directly connected with each other. In other words, the portable terminal 200 is characterized in that a ground terminal GND of an interface unit 270 always electrically connects with a virtual ground terminal VGND of the audio processing unit 260 regardless of an activation of an earphone call function. Through this, the portable terminal 200 may reduce a TDMA noise induced on an earphone during a call in which the earphone is used.

In another exemplary embodiment of the present invention, it is assumed that a side effect does not occur due to electrical connection of only an earphone with the interface unit 270, or electrical connection of a ground terminal GND of the interface unit 270 with a virtual ground terminal VGND of the audio processing unit 260 when another accessory is electrically connected to the interface unit 270. In a case where another accessory is electrically connected to the interface unit 270, if a side effect occurs due to the electrical connection of the ground terminal GND of the interface unit 270 with the virtual ground terminal VGND of the audio processing unit 260, in the same manner as in FIG. 1, the switch unit 180 of FIG. 1 may be inserted electrically between the interface unit 270 and the audio processing unit 260 to determine a type of the accessory mounted in the interface unit 270. Only when an earphone is electrically connected to the interface unit 270, it preferably controls to electrically connect the ground terminal GND of the interface unit 270 with the virtual ground terminal VGND of the processing unit 260. Here, other constructions of FIG. 2 are substantially identical with those of FIG. 1, and thus a detailed description thereof is omitted. For example, microphone 261 and speaker 262 of FIG. 2 are substantially identical to microphone 161 and speaker 162 of FIG. 1.

Figure 3:
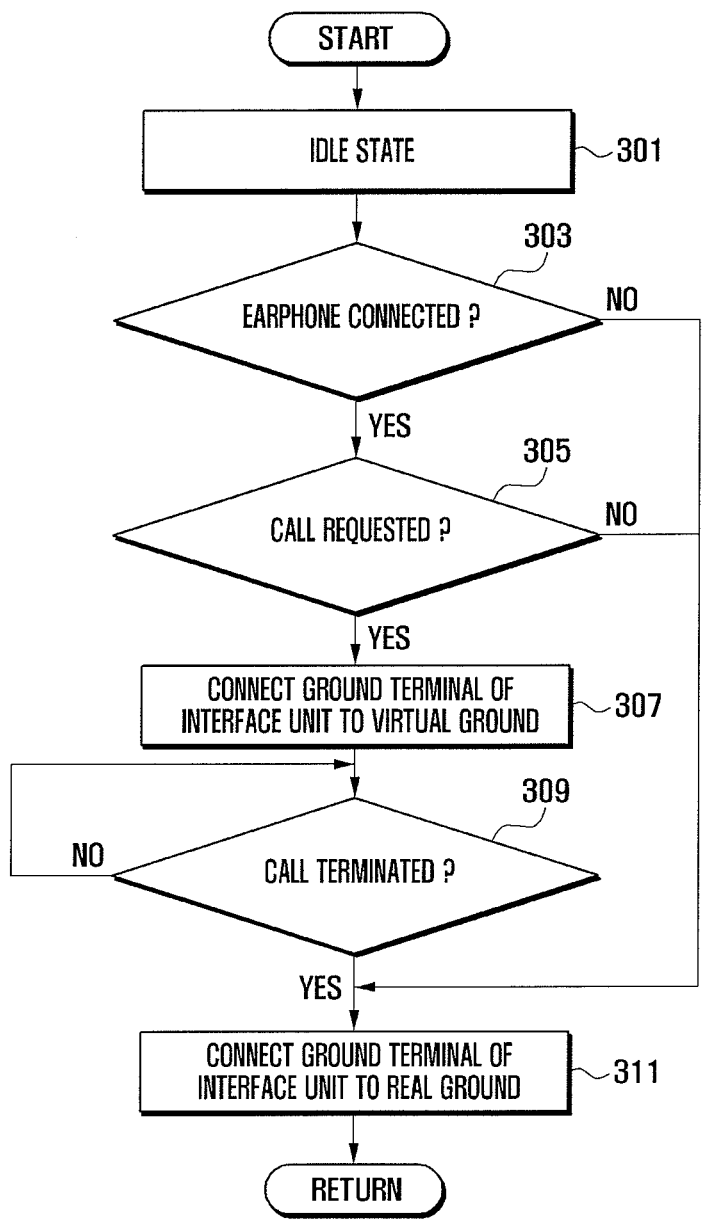
FIG. 3 is a flowchart illustrating a method for reducing a Time Division Multiple Access (TDMA) noise of a portable terminal according to an exemplary embodiment of the present invention.

FIG. 3 is a flowchart illustrating a method for reducing a TDMA noise of a portable terminal according to an exemplary embodiment of the present invention. Hereinafter, the method for reducing a TDMA noise of a portable terminal according to an exemplary embodiment of the present invention will be described with reference to FIG. 1.

Referring to FIG. 1 and FIG. 3, a controller 110 may be in an idle state in step 301. Next, the controller 110 may determine whether an earphone (not shown) is electrically connected to an interface unit 170 in step 303. To do this, the controller 110 may include an accessory connection sensing means and an accessory determining means. Meanwhile, the controller 110 does not include a separate accessory determining means but may output a supportable accessory list on the display unit 130 upon sensing the electrical connection of an accessory, and recognize that an accessory selected by a user from the list is electrically connected to the interface unit 170.

When the earphone (not shown) is not electrically connected to the interface unit 170, the controller 110 may proceed to step 311. That is, the portable terminal 100 may control a switch unit 180 to electrically connect a ground terminal GND of the interface unit 170 with a real ground 20. Conversely, when the earphone is mounted in the interface unit 170, the controller 110 may determine whether a call is requested, that is, a call function is activated in step 305. The call request may include an outgoing call or an incoming call. If the call is not requested at step 305, the controller 110 may proceed to step 311. Conversely, when the call is requested at step 305, the controller 110 may electrically connect a ground terminal GND of the interface unit 170 to a virtual ground in step 307. It is preferred that the virtual ground is included in a sound component, namely, an audio processing unit 160 outputting an audio signal. This is because an audio signal is transmitted to the earphone based on a ground level of a sound component.

The following is a detailed description of step 307. If a call is requested in a state where an earphone is electrically connected to the interface unit 170, a controller 110 may generate a control signal controlling electrical connection of a ground terminal GND of the interface unit 170 with a virtual ground of an audio processing unit 160, and transmit the generated control signal to the switch unit 180 through a control terminal SW_C. If the switch unit 180 receives the control signal, the switch unit 180 electrically connects an input terminal c to a first output terminal a, with the result that a ground terminal GND of the interface unit 170 to a virtual ground terminal VGND of the audio processing unit 160.

Subsequently, the controller 110 may determine whether the call is terminated in step 309. When the call is not terminated, the controller 110 may return to step 309. Conversely, when the call is terminated, the controller 110 may electrically connect the ground terminal GND of the interface unit 170 to a real ground 20 in step 311. In detail, when the call is terminated, the controller 110 may generate a control signal for controlling electrical connection of the ground terminal GND of the interface unit 170 with the real ground 20, and transmit the generated control signal to the switch unit 180 through a control terminal SW_C. If the switch unit 180 receives the control signal, it electrically connects an input terminal c to a second output terminal b, with the result that the ground terminal GND of the interface unit 170 with the real ground 20.

The foregoing exemplary embodiment has illustrated that a ground terminal GND of an interface unit 170 electrically connects with a real terminal 20. However, the present invention is not limited thereto. For example, when an earphone call is terminated, another exemplary embodiment of the present invention may control to maintain an electrical connection state of the ground terminal GND of the interface unit 170 with the real ground. When the radio receiving function is activated, another exemplary embodiment of the present invention may control to electrically connect the ground terminal GND of the interface unit 170 with the real ground 20.

Further, another exemplary embodiment of the present invention may control a switch unit 180 according to an activation of a radio receiving function. That is, when the radio receiving function is deactivated, another exemplary embodiment of the present invention controls the switch unit 180 to electrically connect a ground terminal GND of an interface unit 170 with a virtual ground. When the radio receiving function is activated, another exemplary embodiment of the present invention may control the switch unit 180 to electrically connect the ground terminal GND of the interface unit 170 with a real ground 20.

Figure 4A:
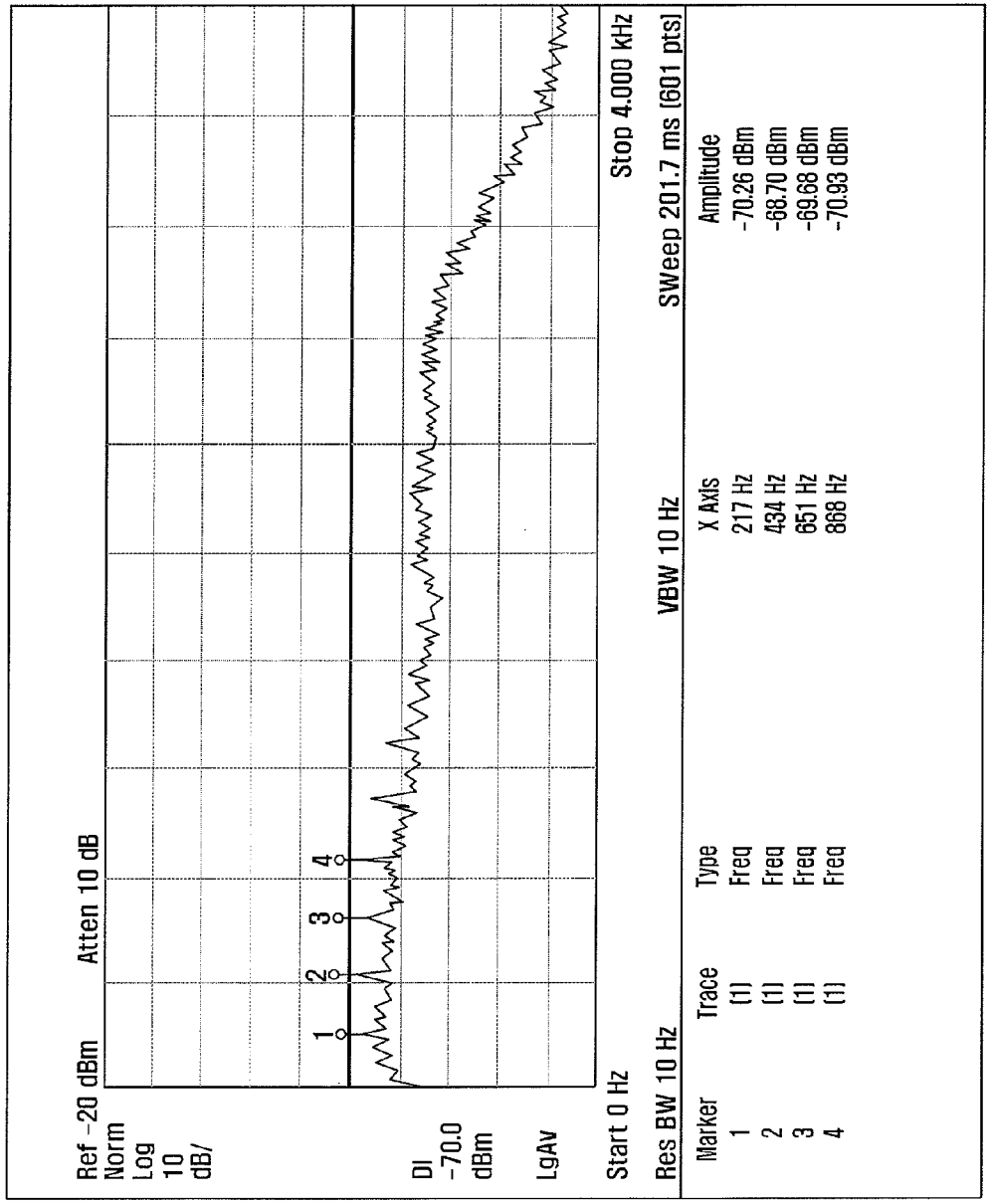
FIGS. 4A and 4B are graphs illustrating a TDMA noise reducing effect of a portable terminal according to an exemplary embodiment of the present invention.
Figure 4B:
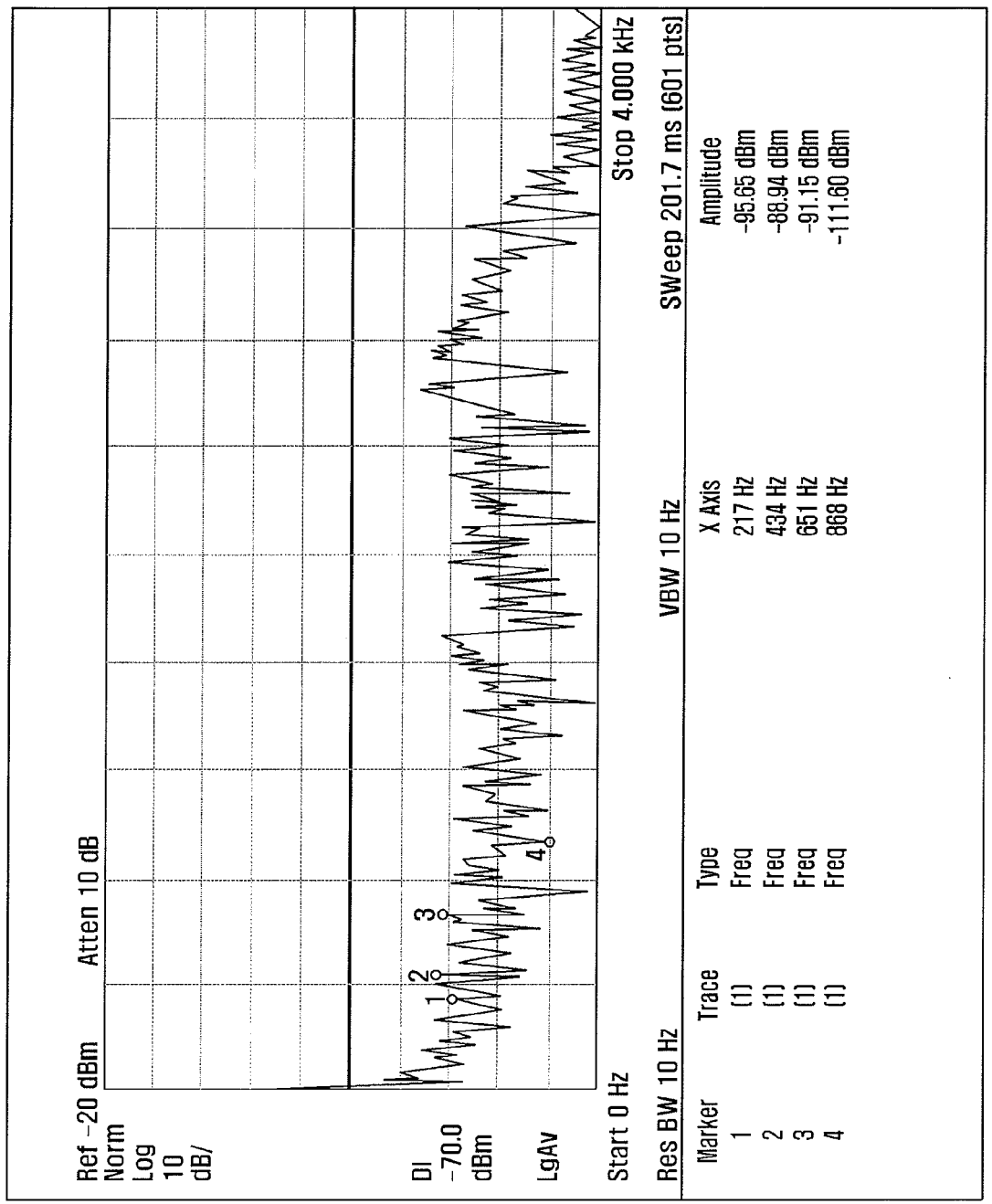

FIGS. 4A and 4B are graphs illustrating a TDMA noise reducing effect of a portable terminal according to an exemplary embodiment of the present invention.

More specifically, FIG. 4A is a graph measuring a TDMA noise level when an earphone call of a portable terminal of the related art is performed. FIG. 4B is a graph measuring a TDMA noise level when an earphone call of a portable terminal according to an exemplary embodiment of the present invention is achieved.

Referring to the graph of FIG. 4A, a TDMA noise of a portable terminal of the related art has the degree in the range of −70 dBm to −60 dBm. In general, when an audio signal has a degree higher than −70 dBm, a user may recognize the audio signal. Accordingly, when a user performs an earphone call using a portable terminal of the related art, the user may recognize a TDMA noise. Due to this, the user may be not be satisfied with the call quality. Meanwhile, referring to the graph of FIG. 4B, a TDMA noise of a portable terminal according to an exemplary embodiment of the present invention has the degree in the range of −110 dBm to −80 dBm. That is, when a user performs an earphone call by a portable terminal 100 according to an exemplary embodiment of the present invention, the user may not recognize the TDMA noise. Through this, an exemplary embodiment of the present invention may provide a TDMA noise reducing effect and provide satisfaction to the user with respect to call quality.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. An apparatus for reducing a Time Division Multiple Access (TDMA) noise of a portable terminal transmitting and receiving a radio frequency signal according to a TDMA scheme, the apparatus comprising:
   an interface unit to which an earphone is electrically connected;
   a radio communication unit configured to transmit an audio signal to another apparatus in a call function and receive an audio signal from the other apparatus in the call function according to the TDMA scheme;
   an audio processing unit including a virtual ground, the virtual ground used to transmit the audio signal received from the other apparatus in the call function to the earphone and receive an audio signal from the earphone through the interface unit;
   a first switch unit located electrically between the interface unit and the audio processing unit configured to electrically connect a ground terminal of the interface unit with one of a real ground and the virtual ground of the audio processing unit; and
   a controller configured to control the first switch unit to:
   electrically connect the ground terminal of the interface unit with the virtual ground of the audio processing unit when a call function using the earphone is activated, and
   electrically connect the ground terminal of the interface unit with the real ground when the call function using the earphone is deactivated.

2. The apparatus of claim 1, further comprising a radio receiver configured to receive a radio signal,
   wherein the ground terminal of the interface unit is electrically connected with an antenna terminal of the radio receiver.

3. The apparatus of claim 2, further comprising a matching unit provided electrically between the interface unit and the radio receiver configured to match an impedance of the radio signal.

4. The apparatus of claim 2, further comprising a matching unit provided electrically between the first switch unit and the real ground configured to match an impedance of the radio signal.

5. The apparatus of claim 1, wherein the interface unit comprises a 3.5 mm connector.

6. The apparatus of claim 1, further comprising a second switch unit located electrically between the interface unit and the audio processing unit, the second switch unit configured to change electrical connection paths of respective terminals of the interface unit according to a type of an accessory electrically connected to the interface unit.

7. A method for reducing a Time Division Multiple Access (TDMA) noise of a portable terminal transmitting and receiving a radio frequency signal according to a TDMA scheme, the method comprising:
   determining whether a call using an earphone is requested; and
   electrically connecting a ground terminal of an interface unit to which the earphone is electrically connected to a virtual ground included with an audio processing unit, the virtual ground used for transmitting an audio signal received from another apparatus in a call function to the earphone and receiving an audio signal from the earphone when the call using the earphone is requested.

8. The method of claim 7, further comprising:
   determining whether the call is terminated; and
   electrically connecting the ground terminal of the interface unit to a real ground of the portable terminal when the call is terminated.

* * * * *